United States Patent
Chwioko

(10) Patent No.: US 11,277,725 B2
(45) Date of Patent: Mar. 15, 2022

(54) APPARATUS AND METHOD FOR INTERFACING WITH A MOBILE DEVICE

(71) Applicant: JAGUAR LAND ROVER LIMITED, Warwickshire (GB)

(72) Inventor: Kudzayi Chwioko, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 459 days.

(21) Appl. No.: 16/328,418

(22) PCT Filed: Aug. 23, 2017

(86) PCT No.: PCT/EP2017/071204
§ 371 (c)(1),
(2) Date: Feb. 26, 2019

(87) PCT Pub. No.: WO2018/041690
PCT Pub. Date: Mar. 8, 2018

(65) Prior Publication Data
US 2021/0281987 A1  Sep. 9, 2021

(30) Foreign Application Priority Data

Sep. 1, 2016  (GB) ...................... 1614843

(51) Int. Cl.
*H04W 4/80* (2018.01)
*H04W 4/48* (2018.01)

(52) U.S. Cl.
CPC ............... *H04W 4/48* (2018.02); *H04W 4/80* (2018.02)

(58) Field of Classification Search
CPC .................. H04W 4/48; H04W 4/80
See application file for complete search history.

(56) References Cited

U.S. PATENT DOCUMENTS

2012/0161927 A1  6/2012  Pierfelice et al.
2014/0306814 A1  10/2014  Ricci
(Continued)

FOREIGN PATENT DOCUMENTS

| WO | 2015/077662 A1 | 5/2015 |
| WO | 2016/030572 A1 | 3/2016 |
| WO | 2016/076587 A1 | 5/2016 |

OTHER PUBLICATIONS

Combined Search and Examination Report under Sections 17 and 18(3) for Application No. GB1614843.9 dated Mar. 2, 2017.
(Continued)

*Primary Examiner* — Tuan H Nguyen
(74) *Attorney, Agent, or Firm* — Carlson, Gaskey & Olds, P.C.

(57) ABSTRACT

Embodiments of the present invention provide a system, comprising first wireless interface means (170) for wirelessly communicating with a first mobile device (210) to receive identification information associated with the first mobile device (210), the first wireless interface means (170) being associated with a first zone (110) of an interior of a vehicle (100), first output means (165, 166, 167) associated with the first zone (110), first data interface means (260) for communicating data with the first mobile device (210), and control means (200) arranged to receive the identification information associated with the first mobile device (210), to associate the first mobile device with the first zone (110) and to direct data received from the first mobile device via the first data interface means to the first output means (165, 166, 167).

20 Claims, 3 Drawing Sheets

(56) References Cited

U.S. PATENT DOCUMENTS

2015/0256669 A1 9/2015 James et al.
2016/0232488 A1* 8/2016 Skaaksrud ......... G06Q 10/0832

OTHER PUBLICATIONS

International Search Report and Written Opinion of the International Searching Authority for International application No. PCT/EP2017/071204 dated Oct. 27, 2017.

* cited by examiner

APPARATUS AND METHOD FOR INTERFACING WITH A MOBILE DEVICE

TECHNICAL FIELD

The present disclosure relates to provision of data from mobile devices and particularly, but not exclusively, to providing audio-visual content from mobile devices. Aspects of the invention relate to a system, to a controller, to a vehicle, to a method and to computer software.

BACKGROUND

It is increasingly desired to provide content from mobile devices, such as phones, tablets etc., to occupants of vehicles. The content may be audio and/or video stored on the mobile device or provided through the mobile device such as via the Internet. In a vehicle there may be several mobile devices operable to provide content. Alternatively not all occupants of the vehicle may desire to be provided with such content. Providing content relevant to occupants may be problematic.

It is an object of embodiments of the invention to at least mitigate one or more of the problems of the prior art.

SUMMARY OF THE INVENTION

Aspects and embodiments of the invention provide a system, a controller, a vehicle, a method and computer software as claimed in the appended claims.

According to an aspect of the present invention there is provided a system, comprising first wireless interface means for receiving identification information associated with a first mobile device, control means arranged to associate the first mobile device with a first zone of an interior of a vehicle in dependence on the identification information, and to direct data received from the first mobile device to first output means associated with the first zone. Optionally, the first mobile device is associated with the first zone such that data is directed to output means of the first zone. The zone may be an infotainment zone of the vehicle, wherein it may be desired to provide content only to one or more occupants of the first zone.

According to an aspect of the invention, there is provided a system, comprising first wireless interface means for wirelessly communicating with a first mobile device to receive identification information associated with the first mobile device, the first wireless interface means being associated with a first zone of an interior of a vehicle, first output means associated with the first zone, first data interface means for communicating data with the first mobile device, control means arranged to receive the identification information associated with the first mobile device, to associate the first mobile device with the first zone and to direct data received from the first mobile device via the first data interface means to the first output means. Optionally, the first mobile device is associated with the first zone such that data is directed to output means of the first zone.

A system as described above, wherein
the first wireless interface means comprises a first wireless interface device;
the first output means comprises a first output device;
the first data interface means comprises a first data interface device; and
the control means comprises a processing device.

The system may comprise second wireless interface means for wirelessly communicating with a second mobile device to receive identification information associated with the second mobile device, the second wireless interface means being associated with a second zone of the interior of the vehicle, second output means associated with the second zone, and second data interface means for communicating data with the second mobile device. The second mobile device may communicate with the second wireless interface means and second data interface means.

A system as described above, wherein
the second wireless interface means comprises a second wireless interface device;
the second output means comprises a second output device; and
the second data interface means comprises a second data interface device.

The control means may be arranged to receive the identification information associated with the second mobile device, to associate the second mobile device with the second zone and to direct data received from the second mobile device via the second interface means to the second output means. Optionally, the second mobile device is associated with the second zone such that data is directed to output means of the second zone.

The first wireless interface means may be operable according to a close-range wireless communication protocol. In an embodiment, the first mobile device is relatively close to the first wireless interface means to communicate, thereby ensuring the first mobile device is proximal to the first zone.

The first wireless interface means may be operable to wirelessly communicate by electromagnetic induction. The first wireless interface means may be operable according to a Near Field Communication protocol. Advantageously convenient communication is enabled.

The second wireless interface means may be operable according to a close-range wireless communication protocol. Advantageously, the second mobile device is relatively close to the second wireless interface means to communicate, thereby ensuring the second mobile device is proximal to the second zone.

The second wireless interface means may be operable to wirelessly communicate by electromagnetic induction. The second wireless interface means may be operable according to a Near Field Communication protocol. Advantageously convenient communication is enabled.

The first data interface means optionally comprises a wireless data interface. The first wireless data interface may be an ad hoc wireless network. Optionally the first wireless data interface is Bluetooth. Advantageously data is communicated in a convenient manner. In some embodiments, a range of the wireless data communication is advantageously further than for the communication of identification information.

The second data interface means optionally comprises a wireless data interface. The second wireless data interface may be an ad hoc wireless network. Optionally, the second wireless data interface is Bluetooth. Advantageously data is communicated in a convenient manner. In some embodiments, a range of the wireless data communication is advantageously further than for the communication of identification information.

The first data interface means may comprise at least one wired data interface. Optionally, the first data interface means is a Universal Serial Bus (USB) interface.

The second data interface means may comprise at least one wired data interface. The second data interface means may be a Universal Serial Bus (USB) interface.

The first output means may be an audio output means for outputting audio predominantly to an occupant of the first zone. Advantageously audio is substantially isolated to the first zone.

The first output means may be an audio-visual output means for outputting audio and/or images predominantly to an occupant of the first zone. Advantageously audio-visual content is substantially isolated to the first zone.

First input means may be associated with the first zone. The first input means may be audio input means. Alternatively or additionally the first input means may be input means for receiving a user's selection input, such as for supporting a Graphical User Interface (GUI).

The second output means may be an audio output means for outputting audio predominantly to one or more occupants of the second zone. Advantageously audio is substantially isolated to the first zone.

The second output means may be an audio-visual output means for outputting one or both of audio and images predominantly to an occupant of the second zone. Advantageously audio-visual content is substantially isolated to the second zone.

Second input means may be associated with the second zone. The second input means may be audio input means. Alternatively or additionally the second input means may be input means for receiving a user's selection input, such as for supporting a Graphical User Interface (GUI).

According to another aspect of the invention, there is provided a controller, comprising input means for receiving identification information associated with a first mobile device from a first wireless interface means associated with a first zone of an interior of a vehicle, input means for receiving data from the first mobile device from a first data interface means, processing means for determining an association of the first mobile device with the first zone and directing data received from the first mobile device via the first data interface means to a first output means associated with the first zone.

A controller as described above, wherein:
the input means comprises an electrical input;
the first wireless interface means comprises a first wireless interface device; and
processing means comprises a processing device.

Optionally the input means is arranged for receiving identification information associated with a second mobile device from a second wireless interface means associated with a second zone of the interior of the vehicle.

The input means may be arranged for receiving data from the second mobile device from a second data interface means.

Optionally the processing means is arranged to associate the second mobile device with the second zone and to direct data received from the second mobile device via the second data interface means to a second output means associated with the second zone.

According to a further aspect of the invention, there is provided a vehicle comprising the system of the corresponding aspect of the invention described above or the controller of the corresponding aspect of the invention described above.

According to a further aspect of the invention, there is provided a method of communicating with a mobile device, comprising receiving identification information associated with a first mobile device from a first wireless interface means wirelessly communicable with the first mobile device, the first wireless interface means being associated with a first zone of an interior of a vehicle, associating the first mobile device with the first zone, receiving data, via a first data interface means, from the first mobile device, and directing the data received from the first mobile device via the first data interface means to a first output means associated with the first zone.

A method as described above, wherein
the first wireless interface means comprises a first wireless interface device;
the first output means comprises a first output device;
the first data interface means comprises a first data interface device; and
the control means comprises a processing device.

The method may comprise receiving identification information associated with a second mobile device from a second wireless interface means wirelessly communicable with the second mobile device, the second wireless interface means being associated with a second zone of the interior of a vehicle.

A method as described above, wherein
the second wireless interface means comprises a second wireless interface device;
the second output means comprises a second output device; and
the second data interface means comprises a second data interface device.

The method may comprise associating the second mobile device with the second zone.

The method may comprise receiving data, via a second data interface means, from the second mobile device.

The method may comprise directing the data received from the second mobile device via the second data interface means to a second output means associated with the second zone.

The data received from the first mobile device is optionally directed to the first output means in dependence on the association of the first mobile device with the first zone.

Data may be provided from an input means associated with the first zone and directed to the first mobile device. The input means may be a first audio input means, such as a first audio input device. Alternatively or additionally, the input means may be a first user input means.

The data received from the second mobile device is optionally directed to the second output means in dependence on the association of the second mobile device with the second zone.

Data may be provided from an input means associated with the second zone and directed to the second mobile device. The input means may be a second audio input means, such as a second audio input device. Alternatively or additionally, the input means may be a second user input means.

Associating the first mobile device with the first zone may comprise storing the identification information associated with the first mobile device in association with the first zone.

Optionally the first data interface means is a first wireless data interface means. The method may comprise pairing the first mobile device with the first wireless data interface means in dependence on the identification information associated with the first mobile device.

Associating the second mobile device with the second zone may comprise storing the identification information associated with the second mobile device in association with the second zone.

The second data interface means may be a second wireless data interface means. The method may comprise pairing the second mobile device with the second wireless data interface means in dependence on the identification information associated with the second mobile device.

Directing the data received from the first mobile device to the first output means optionally comprises determining identification information associated with the first mobile device and directing the data in dependence thereon.

The data received from the first mobile device may comprise audio data. The method may comprise outputting audio predominantly to one or more occupants of the first zone.

The data received from the first mobile device may comprise image data. The method may comprise outputting images predominantly to one or more occupants of the first zone.

The data received from the second mobile device may comprise audio data. The method may comprise outputting audio predominantly to one or more occupants of the second zone.

The data received from the second mobile device may comprise image data. The method may comprise outputting images predominantly to one or more occupants of the second zone.

According to an aspect of the invention, there is provided computer software which, when executed by a computer, is arranged to perform a method according to aspect of the invention. The computer software may be stored on a computer readable medium. The software may be tangibly stored on a computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
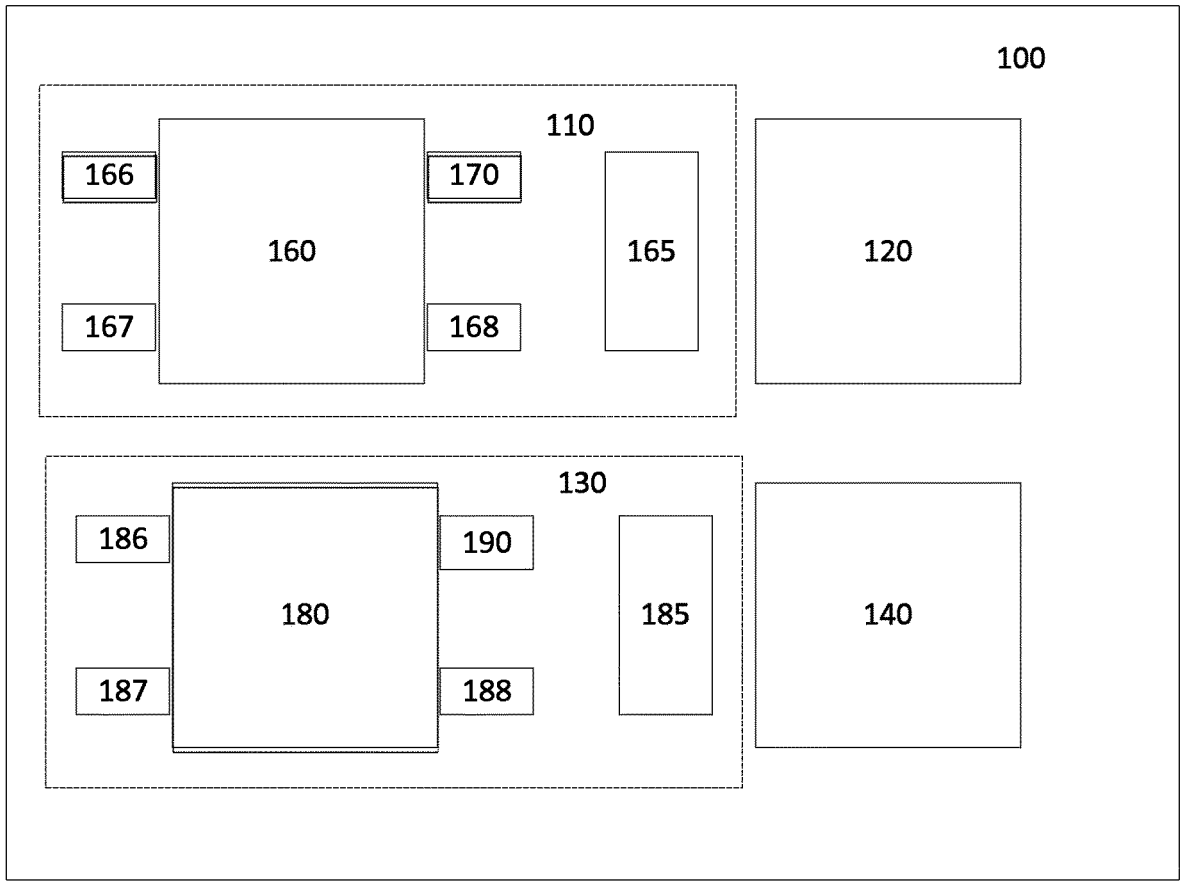
FIG. 1 shows a vehicle according to an embodiment of the invention.

FIG. 1 schematically illustrates a vehicle according to an embodiment of the invention. The vehicle 100 comprises a plurality of seating positions 120, 140, 160, 180. Four seating positions are illustrated, in a two-by-two arrangement, although it will be realised that this is merely an example and that other numbers of seating positions, such as five seating positions, and in other arrangements may be envisaged. Each seating position 120, 140, 160, 180 is associated with a respective seat for an occupant of the vehicle 100.

First and second seats 120, 140 are front seats of the vehicle 100 whilst third and fourth seats 160, 180 are rear seats of the vehicle 100. At least some of the seats 160 180 are associated with a zone 110, 130 of the vehicle, which may be known as an infotainment zone. It is desired to provide content, and to generally insulate content within, each infotainment zone. Each zone of the vehicle may be a subset or portion of the interior of the vehicle 100.

As illustrated in FIG. 1 the vehicle 100 comprises two zones, namely first zone 110 and second zone 130. The vehicle 100 may comprise other numbers of zones, such as three or four zones. In FIG. 1 the first zone 110 is associated with the third seating position 160 and the second zone 130 is associated with the fourth seating position 180, thus there is a one-to-one correspondence between seating positions and zones in the illustrated embodiment. However one or more zones may be associated with more than one seating position. For example, a first zone may be associated with one of the front seats for a passenger occupant of the vehicle i.e. not a driver of the vehicle whilst a second zone is associated with all of the rear-seating positions of the vehicle. It will be realised that other arrangements of zones and association with seating positions within the vehicle 100 may be envisaged.

Each zone 110, 130 within the vehicle 100 is associated with one or more output means 165, 166, 167, 185, 186, 187. The output means associated with each zone are directed to output audio and/or images/video predominantly to one or more occupants of the respective zone.

In the vehicle 100 of FIG. 1 the output means 165,185 are visual output means each associated with a respective zone 110, 130. A first visual output means 165 is associated with the first zone 110 and a second visual output means 185 is associated with the second zone 130. Each visual output means 165, 185 may be a visual display device such as a display screen. For example a display screen which may be mounted within the vehicle 100, such as suspended from a roof of the vehicle, mounted in an arm rest of a seat 160, 180 or in a seat back. Each visual output means 165, 185 is operable to display still and/or moving images thereon. In some embodiments, the visual output means 165, 185 is also operable to function as an input means (thus being input/output means 165, 185) for receiving a user's input. As will be explained, the user's input is directed to a mobile device from the input/output means 165, 185.

Each zone 110, 130 is further associated with one or more audio output means 166, 167, 186, 187. The audio output means 166, 167, 186, 187 may be one or more speakers. As noted above, the audio output means are arranged to provide audio predominantly to the one or more occupants of the zone 110, 130 with which they are associated. In one embodiment, one or more audio output means are mounted within the seat or headrest of the seat in order to direct output audio to the occupant of the seat. The third seat 160 is associated in the illustrated embodiment with two audio output devices 166, 167 and fourth seat is associated with two audio output devices 186, 187, although other numbers of output devices are envisaged. When mounted in the headrest, audio isolation between the zones 110, 130 of the vehicle 100 is improved.

In some embodiments, each zone is associated with an audio input means 168, 188. A first audio input means 168 is arranged in the first zone 110. A second audio input means 188 is arranged in the second zone 130. Each audio input means may be an audio input device such as a microphone 168, 188. The audio input means 168, 188 are arranged to provide a signal indicative of audio predominantly from the one or more occupants of the zone 110, 130 with which they are associated. In use, the audio output means and the audio input means of each zone may be used to support a call, such as a telephone or call supported over another communication network such the Internet, with occupants of the zone 110, 130 with which they are associated. For example a first call may be supported by the audio output and input means 166, 167, 168 of the first zone 110 whilst a second call may be supported by the audio output and input means 186, 187, 188 of the second zone 130. The first and second calls may be supported simultaneously.

Each zone 110, 130 of the vehicle 100 is associated with a respective wireless interface means 170, 190. The wireless interface means 170, 190 is an apparatus for, in use, wirelessly communicating with a mobile device (not illustrated in FIG. 1). The mobile device may be a mobile phone, tablet computer, wrist-worn computing device, laptop etc. The wireless interface means 170, 190 may a close-range wireless communication apparatus i.e. such that only a mobile device relatively close to the interface means 170, 190 may be communicated with. By relatively close it is meant less than 50 cm, or less than 25 cm. Each wireless interface means 170, 190 may be a respective wireless communication unit. Each unit may be operable to wirelessly communicate with the mobile device by electromagnetic induction. That is, the unit 170, 190 may comprise one or more coils which are in use electromagnetically coupled to one or more coils of the mobile device to exchange data. The wireless interface means 170, 190 is, in some embodiments, a near-field communication (NFC) device. The wireless interface means 170, 190 may be mounted proximal to at least one seating position within the respective zone. For example, in one embodiment, a first wireless interface means 170, such as an NFC device, is arranged proximal to the third seating position 160 whilst a second wireless interface means 190 is arranged proximal to the fourth seating position 180. The wireless interface means 170, 190 may be integrated into a portion of the vehicle interior proximal to the respective seating position 160, 180. The wireless interface means 170, 190 may be integrated into a body of the seat 160, 180, headrest or armrest associated with the seat, although other mounting positions may be envisaged.

The wireless interface means 170, 190 are provided for wirelessly communicating with respective mobile devices to receive identification information associated with the mobile devices. In particular, the wireless interface means 170, 190 are provided for receiving information identifying a mobile device of an occupant of each zone 110, 130 of the vehicle 100. The identification information is used to provide content from the mobile device to the output means associated with the zone 110, 130 via a data interface, as will be explained. In use, one or more occupants of each zone 110, 130 are provided with content from the mobile device from which identification information is received by the wireless interface means 170, 190 associated with the respective zone 110, 130.

Figure 2:
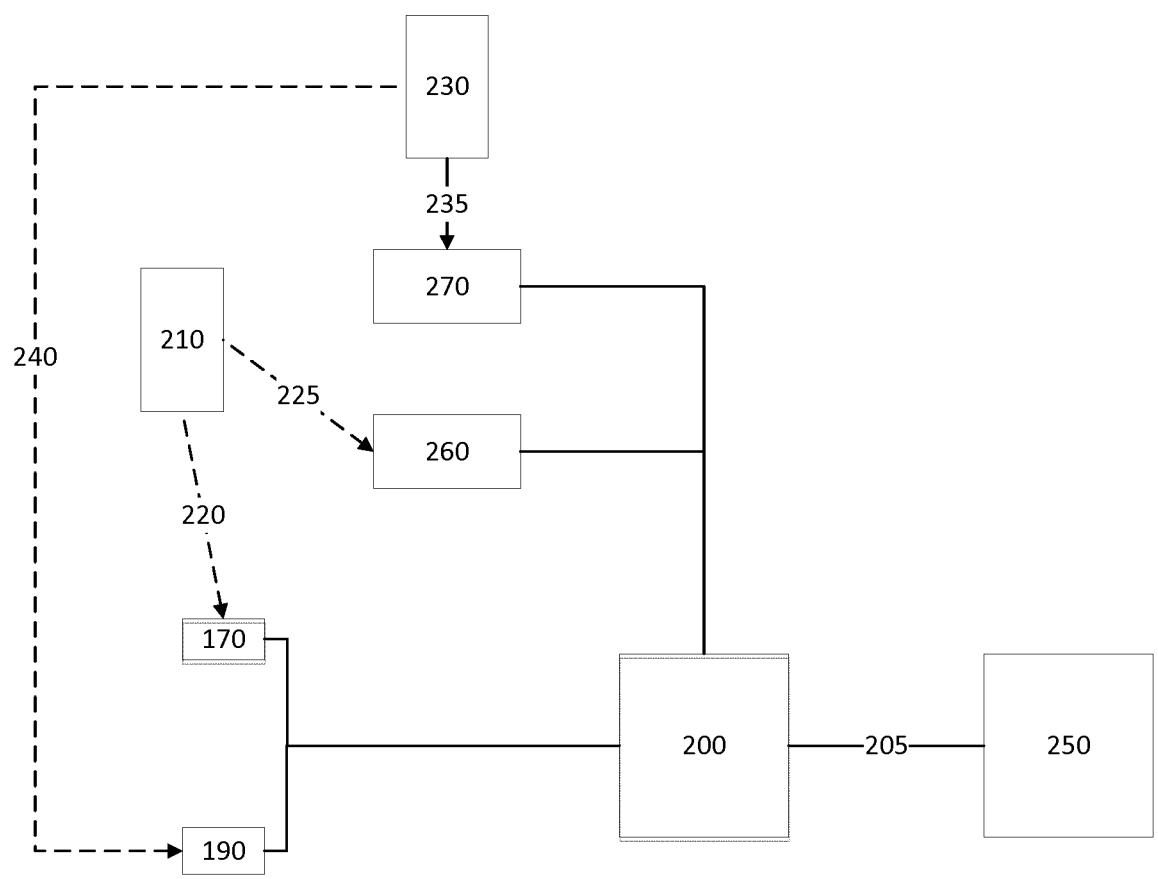
FIG. 2 shows a schematic of a system including a controller according to an embodiment of the invention.

FIG. 2 illustrates a system according to an embodiment of the invention comprising a control means in the form of a controller 200 according to an embodiment of the invention. The system further comprises at least one data interface means 260, 270 for receiving data from one or more mobile devices 210, 230. In particular, the one or more data interface means 260, 270 are arranged to receive audio and/or visual data, AV data, from the one or more mobile devices 210, 230.

The controller 200 may be implemented as an electronic device comprising one or more processors operative to execute computer software instructions which may be stored in a memory accessible to the one or more processors, such as a memory device of the controller 200. The controller 200 may be communicably coupled to a communication bus 205 of the vehicle 100 to exchange, i.e. to send and/or receive data, with other units or modules communicably coupled with the communication bus 205. The communication bus 205 may be implemented by, for example, a communication network such as one of CANBus, Ethernet or Flexray, although other bus protocols may be envisaged.

In the illustrated embodiment the controller 200 is communicable with an audio-visual (AV) domain controller ADC 250. Although not illustrated in FIG. 2 for clarity, the ADC 250 is arranged to communicate with the output means 165, 166, 167, 185, 186, 187 discussed above of the vehicle 100 to output audio and/or images to occupants of the vehicle.

The controller 200 is communicably coupled with the wireless interface means 170, 190 described above. Although FIG. 2 illustrates the controller 200 being directly coupled to the wireless interface means 170, 190 it will be realised that the wireless interface means 170, 190 may be indirectly coupled to the controller 200. The controller 200 is operable to receive the identification information from mobile devices 210, 230 via the wireless interface means 170, 190.

The one or more data interface means 260, 270 may comprise a wireless data interface device 260 for wirelessly communicating data with one or more mobile devices 210, 230. The wireless data interface 260 may be operative to wirelessly communicate with a plurality of mobile devices 210, 230, wherein each mobile device 210, 230 is assigned a respective address to facilitate unique communication. The wireless data interface 260 may support a wireless network. The wireless network may be an ad hoc network, such as Bluetooth. However the wireless data interface 260 may operate according to another wireless communication protocol such as Wi-Fi. The wireless data means 260, 270 interface may support a higher data rate than the wireless interface means 170, 190, thus being suitable to exchange data representing content such as audio and/or images/video.

The one or more data interface means 260, 270 may comprise a wired data interface for communicating data with one or more mobile devices 210, 230. The wired data interface may be a Universal Serial Bus (USB) interface although other communication protocols may be envisaged.

In the example of FIG. 2, a first mobile device 210 is arranged to wirelessly communicate data 225 with, in particular to transmit data to, a first wireless data interface 260 which may be a Bluetooth network control device 260. A second mobile device 230 is arranged to communicate data 235 with, in particular to transmit data to, a second data interface 270 which may be a USB interface 270. It will be appreciated that other communication protocols may be used and the system may comprise only one of the first and second data interfaces 260, 270, or additional data interfaces.

Each mobile device 210, 230 comprises means for communicating with at least one of the data interface means 260, 270. In the example of FIG. 2, the first mobile device 210 comprises a Bluetooth communication module and the second mobile device comprises a USB interface. Furthermore, each mobile device 210, 230 comprises a corresponding module for communicating with the wireless interface means 170, 190. In one embodiment, each mobile device 210, 230 comprises an NFC module for communicating data with the wireless interface means 170, 190.

Figure 3:
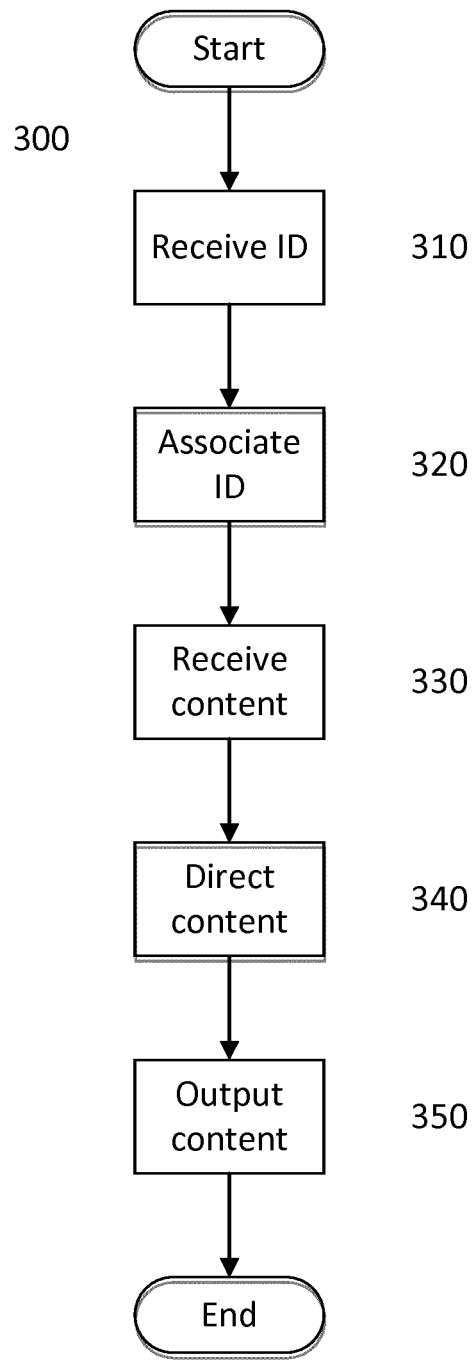
FIG. 3 shows a method according to an embodiment of the invention.

FIG. 3 illustrates a method 300 according to an embodiment of the invention. The method 300 is a method of providing content from a mobile device 210, 230.

The method 300 comprises a step 310 of receiving identification (ID) information. The identification information is information uniquely identifying a mobile device. The identification information may comprise, for example, an IMEI number of a mobile phone, a MAC or IP addresses of the mobile device. It will be appreciated that other forms of identification information may be envisaged. In step 310 the identification information is received via one of the wireless interface means 170, 190 of the vehicle 100. For example, step 310 may comprise the first mobile device 210 being brought into communication range of the first wireless interface means 170 such that the identification information may be received from the mobile device 210, as indicated by dashed arrow 220 indicative of wireless communication. Where the first wireless interface means 170 is an NFC device, step 310 may comprise the NFC device 170 electromagnetically coupling with the NFC module of the first mobile device 210 to communicate data. Thus step 310 may comprise the first mobile device 210 being placed in close proximity to the NFC device 170, such as against a portion of the seat 160 where the NFC device 170 is located. The identification information is provided to the controller 200. Whilst step 310 is described in relation to the first mobile device 210, it will be realised that identification information of the second mobile device 230 may also be received such as at the second wireless interface means 190 in a similar manner, as indicated by arrow 240.

In step 320 the identification information is associated with a zone 110, 130, or infotainment zone, of the vehicle 100. The identification information is associated with the zone according to which wireless interface means 170, 190 was used to receive the identification information. The identification information may be associated with the zone in which the wireless interface means 170, 190 is associated. For example, where identification information of the first mobile device is received via the first wireless interface means 170 associated with the first zone 110, the identification information is also associated with the first zone 110. Thus the first mobile device 210 is associated with the first zone 110. Similarly, the second mobile device 230 may become associated with the second zone 130 via the second wireless interface means 190. In some embodiments, one mobile device may become associated with each zone 110, 130. The association may be stored in a memory of the controller 200.

In step 330 data representing content is received. The data may be audio data representing audio, image data representing one or more still images, or video data representing audio and/or moving images. The data is received in step 330 via a data interface such as one of the data interface means 260, 270. Step 330 may comprise one or both of the mobile devices 210, 230 connecting to a network associated with the data interface means. For example, where the first data interface means is a Bluetooth network control device 260, step 330 may comprise one or more mobile devices 210, 230 associating with, or connecting to, the Bluetooth network. The identification information received in step 310 may be used to establish the mobile device 210 on the network. For example, the Bluetooth network control device 260 may use the received identification information to pair with the mobile device 210 to establish wireless communication therewith. In this way, a separate step or process of joining the mobile device 210 on the wireless data network is not required. Step 330 may comprise the user connecting the mobile device to a wired network, such as connecting a USB connection to the mobile device 230 as illustrated in FIG. 2. It will be appreciated that where the data interface means 260, 270 is a wireless data interface means more than one, such as both of, the mobile devices 210, 230 may be connected to the wireless data interface means 260.

Step 330 may further comprise a step of a user of the mobile device requesting content to be output from the mobile device 210. The request may be received at the mobile device 210 or at a user interface of the vehicle 100. For example a Graphical User Interface (GUI) may be displayed on the visual output means 165, 185 of the zone with which the mobile device 210, 230 is associated. The GUI may comprise an indication of only the content available from the respective mobile device 210, 230. The content may be content stored upon the mobile device i.e. in a memory thereof, or content accessible to the mobile device. The content may be accessible from a remote storage device with which the mobile device is linked i.e. cloud storage device, or may be content accessible to the mobile device, such as via a subscription service to which the owner of the mobile device 210, 230 subscribes. Input provided to the GUI is directed to the mobile device associated with the respective zone of the GUI.

Data representing the content is communicated from the mobile device 210, 230 to the data interface 260, 270. Step 330 may comprise the mobile device 210, 230 wirelessly transmitting the data representing the requested content, as indicated by arrow 225, or communicating the data over a wired connection, as indicated by arrow 235.

Step 340 comprises directing the content to an output means. The content is directed based upon the source of the content i.e. the mobile device 210, 230 from which it is received and the one or more associations determined in step 320. The content from the mobile device 210, 230 may comprise information indicating the mobile device 210, such as the identification information received in step 320. The identification information may form part of the content, such as a header of one or more packets comprising the content. Step 340 may comprise examining the content to determine the identification information contained therein. The identification information obtained from the content may then be compared against the one or more associations determined in step 320 to determine the zone 110, 130 with which the content is associated. The content is then directed to output means associated with the respective zone 110, 130 in step 340. Step 340 may comprise the data being provided to the ADC 250 along with an indication of the intended zone 110, 130 for the data. In step 340, if no association exists for the mobile device providing the content, then the content may be directed to one or more default output means, or to all output means within the vehicle 100.

In some embodiments, the content is data representing a call associated with the mobile device. Incoming data received at the mobile device, such as mobile device 210, is directed to the output means associated with the zone with which the device 210 is associated, such as the first zone 110. Similarly, data received at input means of the zone, such as the audio input means 168 or the visual input means 165, is directed to respective the mobile device from the zone. In this way the call may be supported by the mobile device in association with the input/output means 165, 166, 167, 168 of the respective zone. Furthermore a plurality of independent calls may be supported with each of plurality of zones 110, 130 which may be at least partly simultaneous.

In step 350 the data is output to the respective zone. For example, where the data representing content is received from the first mobile device 210 and is audio data, the ADC 250 provides the data to one or more audio output means 166, 167 (not illustrated). The one or more audio output means 166, 167 are arranged to output audio predominantly to one or more occupants of the first zone 110 i.e. seated within the first zone 110. However when the data received from the first mobile device 210 is image data, the ADC 250 provides the data to the one or more visual output means 165 directed to the first zone 110. Similarly, video data is provided to both the speaker devices 166, 167 and the visual output means 165 of the first zone. In this way, occupants within the first zone 110 of vehicle 100 are provided with data received from the first mobile device 210. Similarly, data from the second mobile device 230 is output predominantly within the second zone. That is, data from the first mobile device 210 is not output, substantially, within the second zone 130 and data from the second mobile device 230 is not output, substantially, within the first zone 110.

It can be appreciated that embodiments of the present invention allow content from a mobile device to easily be directed to a portion of a vehicle associated with a user of the mobile device.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A system, comprising:
    a first wireless interface device associated with a first zone of an interior of a vehicle for wirelessly communicating with a first mobile device within the first zone to receive identification information associated with the first mobile device;
    a first output device associated with the first zone;
    a first data interface device for data communications with the first mobile device;
    a controller arranged to receive the identification information associated with the first mobile device, to associate the first mobile device with the first zone and to direct data received from the first mobile device via the first data interface device to the first output device;
    a second wireless interface device associated with a second zone of the interior of the vehicle for wirelessly communicating with a second mobile device within the second zone to receive identification information associated with the second mobile device;
    a second output device associated with the second zone; and
    a second data interface device for data communications with the second mobile device;
    wherein the controller is arranged to receive the identification information associated with the second mobile device, to associate the second mobile device with the second zone and to direct data received from the second mobile device via the second data interface device to the second output device.

2. The system of claim 1, wherein one or both of the first wireless interface device and the second wireless interface device is operable according to a close-range wireless communication protocol.

3. The system of claim 2, wherein one or both of the first wireless interface device and the second wireless interface device is operable to wirelessly communicate by electromagnetic induction.

4. The system of claim 1, wherein one or both of the first data interface device and the second data interface device comprises a wireless data interface.

5. The system of claim 4, wherein one or both of the first data interface and the second data interface is an ad hoc wireless network.

6. The system of claim 1, wherein one or both of the first data interface device and the second data interface device comprises at least one wired data interface.

7. The system of claim 1, wherein the first output device is one of:
    an audio output device for outputting audio predominantly to an occupant of the first zone; or
    an audio-visual output device for outputting one or both of audio and images predominantly to an occupant of the first zone; and
    wherein the second output device is one of:
    an audio output device for outputting audio predominantly to one or more occupants of the second zone; or
    an audio-visual output device for outputting one or both of audio and images predominantly to an occupant of the second zone.

8. A controller, comprising:
    at least one input device configured to
        receive identification information associated with a first mobile device in a first zone of an interior of a vehicle from a first wireless interface device associated with the first zone of the interior of the vehicle;
        receive data from the first mobile device from a first data interface device;
        receive identification information associated with a second mobile device in a second zone of the interior of the vehicle from a second wireless interface device associated with the second zone of the interior of the vehicle, and receive data from the second mobile device from a second data interface device; and a processor configured to determine an association of the first mobile device with the first zone, direct data received from the first mobile device via the first data interface device to a first output device associated with the first zone, associate the second mobile device with the second zone, and direct data received from the second mobile device via the second data interface device to a second output device associated with the second zone.

9. A vehicle comprising the controller of claim 8.

10. A method of communicating with a mobile device, the method comprising:

receiving identification information associated with a first mobile device in a first zone of an interior of a vehicle from a first wireless interface device configured to wirelessly communicate with the first mobile device, the first wireless interface device being associated with the first zone of the interior of the vehicle;

associating the first mobile device with the first zone;

receiving data, via a first data interface device, from the first mobile device;

directing the data received from the first mobile device via the first data interface device to a first output device associated with the first zone;

receiving identification information associated with a second mobile device in a second zone of the interior of the vehicle from a second wireless interface device configured to wirelessly communicate with the second mobile device, the second wireless interface device being associated with the second zone of the interior of the vehicle;

associating the second mobile device with the second zone;

receiving data, via a second data interface device, from the second mobile device; and directing the data received from the second mobile device via the second data interface device to a second output device associated with the second zone.

11. The method of claim 10, wherein the data received from the first mobile device is directed to the first output device in dependence on the association of the first mobile device with the first zone.

12. The method of claim 10, wherein the data received from the second mobile device is directed to the second output device in dependence on the association of the second mobile device with the second zone.

13. The method of claim 10, wherein associating the first mobile device with the first zone comprises storing the identification information associated with the first mobile device in association with the first zone.

14. The method of claim 10, wherein the first data interface device is a first wireless data interface device, and the method comprises pairing the first mobile device with the first wireless data interface device in dependence on the identification information associated with the first mobile device.

15. The method of claim 10, wherein associating the second mobile device with the second zone comprises storing the identification information associated with the second mobile device in association with the second zone.

16. The method of claim 10, wherein the second data interface device is a second wireless data interface device, and the method comprises pairing the second mobile device with the second wireless data interface device in dependence on the identification information associated with the second mobile device.

17. The method of claim 10, wherein directing the data received from the first mobile device to the first output device comprises determining the identification information associated with the first mobile device and directing the data in dependence on the determining.

18. The method of claim 10, wherein the data received from one or both of the first mobile device and the second mobile device comprises audio data; and the method comprises outputting audio predominantly to one or more occupants of one or both of the first zone and the second zone, respectively.

19. The method of claim 10, wherein the data received from one or both of the first mobile device and the second mobile device comprises image data; and the method comprises outputting images predominantly to one or more occupants of one or both of the first zone and the second zone, respectively.

20. A non-transitory computer-readable storage medium containing instructions which, when executed by a computer, cause the computer to perform the method according to claim 10.

* * * * *